US006173227B1

United States Patent
Speicher et al.

(10) Patent No.: US 6,173,227 B1
(45) Date of Patent: Jan. 9, 2001

(54) METHOD OF SETTING THE TRANSMISSION RATIO OF A CONTINUOUSLY VARIABLE GEAR

(75) Inventors: Patrick Speicher, Oberteuringen; Udo Gillich, Meckenbeuren; Wolfgang Danz, Friedrichshafen; Ralf Vorndran, Bodolz, all of (DE)

(73) Assignee: ZF Friedrichshafen AG, Friedrichshafen (DE)

( * ) Notice: Under 35 U.S.C. 154(b), the term of this patent shall be extended for 0 days.

(21) Appl. No.: 09/091,909

(22) PCT Filed: Dec. 27, 1996

(86) PCT No.: PCT/EP96/05849

§ 371 Date: Jun. 24, 1998

§ 102(e) Date: Jun. 24, 1998

(87) PCT Pub. No.: WO97/25557

PCT Pub. Date: Jul. 17, 1997

(30) Foreign Application Priority Data

Jan. 12, 1996 (DE) .............................. 196 00 915

(51) Int. Cl.[7] ................................................. G06F 7/00
(52) U.S. Cl. .................. 701/51; 701/55; 701/61; 477/43
(58) Field of Search ................... 701/51, 55, 56, 701/58, 60, 61, 62, 64, 57; 474/18, 29, 28; 477/48, 45, 138, 47, 37, 43, 46, 49, 69, 115; 74/385, 336 R

(56) References Cited

U.S. PATENT DOCUMENTS

| 4,945,483 | 7/1990 | Tokoro ........................ 364/424.1 |
| 5,131,297 | 7/1992 | Yamashita et al. ................ 74/866 |
| 5,161,433 | 11/1992 | Sakakibara et al. ............... 74/866 |
| 5,319,559 | * 6/1994 | Kusaka et al. ...................... 477/63 |
| 5,368,530 | 11/1994 | Sanematsu et al. ................ 477/43 |
| 5,433,677 | * 7/1995 | Petersmann et al. .............. 477/169 |
| 5,474,505 | * 12/1995 | Seidel et al. ...................... 477/49 |
| 5,527,231 | * 6/1996 | Seidel et al. ...................... 477/46 |
| 5,527,232 | * 6/1996 | Seidel et al. ...................... 477/46 |
| 5,545,106 | * 8/1996 | Roovers et al. ................... 477/43 |
| 5,609,068 | * 3/1997 | Gruhle et al . ................... 74/336 R |
| 5,919,244 | * 7/1999 | Danz et al. ....................... 701/57 |

FOREIGN PATENT DOCUMENTS

| 40 40 502 A1 | 6/1991 | (DE) . |
| 41 06 471 A1 | 8/1991 | (DE) . |
| 42 23 967 A1 | 1/1994 | (DE) . |
| 43 12 415 A1 | 10/1994 | (DE) . |
| 44 45 325 A1 | 6/1995 | (DE) . |
| 0 065 668 A2 | 12/1982 | (EP) . |
| 0 574 968 A1 | 12/1993 | (EP) . |
| 0 708 275 A1 | 4/1996 | (EP) . |
| WO 90/04119 | 4/1990 | (WO) . |
| WO 94/24463 | 10/1994 | (WO) . |

OTHER PUBLICATIONS

Japanese Abstract, vol. 018, No. 512 (M–1679), Sep. 27, 1994 JP 6174022.
Japanese Abstract, JP 06 174022 A (Suzuki Motor Corp; Others: 01), Jun. 21, 1994.

* cited by examiner

*Primary Examiner*—Jacques H. Louis-Jacques
(74) *Attorney, Agent, or Firm*—Davis and Bujold

(57) ABSTRACT

The invention relates to a method of adjusting the transmission ratio of a continuously variable gear. The position of a current operating point (B_akt) in a predetermined driving range is constantly adjusted in accordance with the driving situation. The position of the operating point is also determined by range boundaries (UG, OG) which can be varied in accordance with the driving resistance and the driver's manner of driving. The method is characterized in that it simplifies development and application.

15 Claims, 5 Drawing Sheets

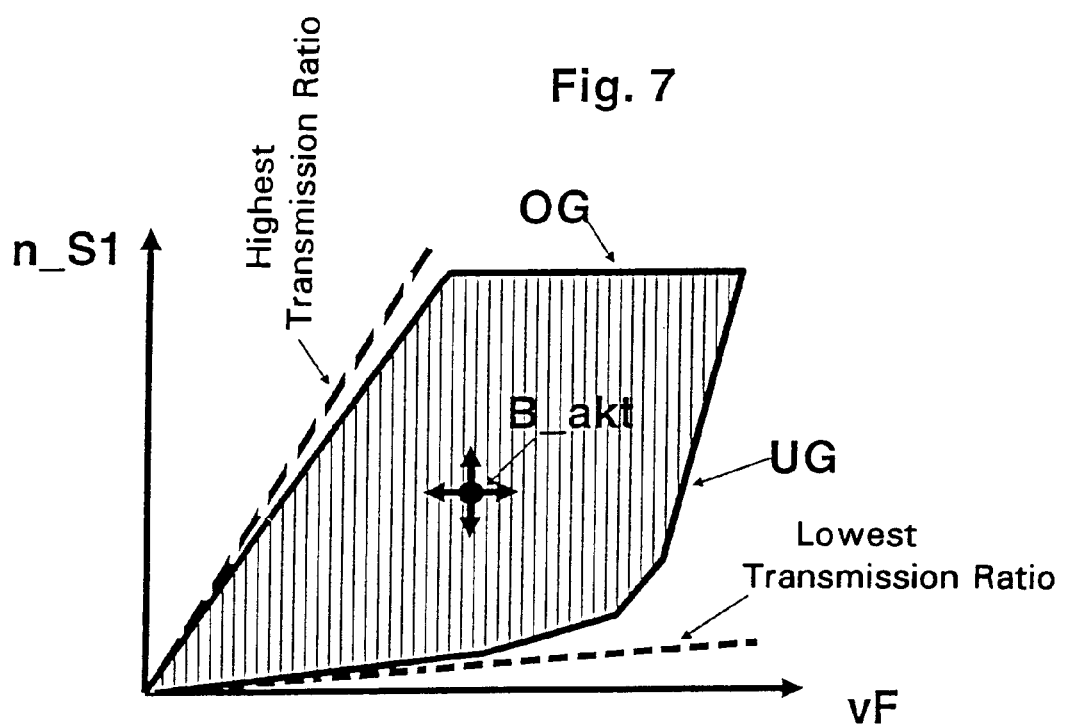

METHOD OF SETTING THE TRANSMISSION RATIO OF A CONTINUOUSLY VARIABLE GEAR

The invention relates to a method of setting the transmission ratio of an automatic transmission, in particular of a continuously variable transmission having means for detecting input signals which are derived from a driver-vehicle system and which can process at least one output signal by which a setting of the gear ratio and/or a setting of the speed of a prime mover and/or a setting of the vehicle acceleration or the like are brought about within the scope of an operating strategy.

BACKGROUND OF THE INVENTION

The controllable parameters in a continuously variable transmission differ from a stepped automatic transmission. The controllable parameters in the stepped automatic transmission consist of two independent parameters: the moment of the gearshift and the kind of gearshift (upshift or downshift).

Compared to that, in a continuously variable gear three independent parameters have to be taken into account: a starting point (for example, an output speed or output transmission ratio), an objective (for example, an end speed or a desired transmission ratio) and the temporary variation between starting point and objective.

In the requirement profile of a driving strategy for a continuously variable gear, the crucial points for good driveability are a favorable consumption and an application expenditure utilizable in the practice. In the conversion of a driving strategy, the resource requirement must be small. The driving strategy must automatically adapt to different driving situations (driver, vehicle and environment). In case of errors common in the practice, the system must react insensitively, that is, possess a certain sturdiness.

Within the crucial points, in turn, a series of individual problems are of special significance. In the driveability, it is important to meet requirements such as: a good relationship between engine speed and road speed; engine dynamic and driving performance corresponding to the desired performance; adaptation to the driver's desires; possibility of manual contact for the driver; adaptation to the driving state (for example, city uphill); support of the vehicle brake; integration of the converter into the driving strategy; reliable reverse shifting after low when stopping; and adaptation to the driving usages specific to the country.

Regarding the resource requirements in the conversion little EPROM; little RAM; and a short running period requirement are wanted.

By sturdiness of the driving strategy, to be understood are properties such as: insensitivity to errors of the input signals; and insensitivity when scatterings of the vehicle parameters occur within a vehicle series of a manufacturer.

Important in the section of the requirement profile dealing with consumption are the special aim requirements like: a long hold-up duration in consumption-favorable ranges of the engine performance graph; the target performance of a high engine output at the lowest possible speeds; a reduction of the engine speed during constant drive; and an operating point guidance during coasting corresponding to the coasting disengagement of the engine.

In the application what is important is: reliable, constant setting of an operating point achievable for the driver in all driving situations; optional combination of input parameters; brief application periods at high operational density; and great flexibility when taking into consideration the desires of the vehicle manufacturer.

In the automatic adaptation, the following is concerned: adaptation to the momentary mode of driving; adaptation to the momentary environmental conditions (uphill, downhill, etc.); and adaptation to the momentary driving state (cold or warm vehicle, additional consumption, trailers, etc.).

As a consequence of the requirement profile for a driving strategy in a continuously variable gear, three systematic problems can be formulated by abstraction: the driving strategy must be adaptive; efficient tools must be available for the development; and the application of the driving strategy must be capable of being electronically supported.

Comparing the requirement profile for a driving strategy of a continuously variable gear with the solutions already known, in spite of the multiplicity of known driving strategies, individual problems are solved, but no driving strategy is known that totally satisfies the application profile.

Thus, for example, the setting of an operating point has been satisfactorily solved by taking into account individual input parameters. But this conclusion does not apply to an optional combination of the input parameters.

In the complexity of the requirement profile, the description of the relationships turns out to be correspondingly expensive and thus, also for these reasons, an efficient programming and application is still not possible.

To set an operating point, taken into account are the individual input parameters of the known, electronically controlled continuously adjustable gears, of which (independently of the driver's wish or automatically) it is possible to drive on different characteristic lines of the engine performance graph. The operation takes place either on the characteristic line of an optimal consumption or on a characteristic line of optimal performance. From the characteristic lines of the engine performance graph, shifting characteristic lines in the shifting performance graphs are derived which allow adjustment of the gear to a so-called economy or a sport mode. In the solution given in DE-A 43 12 415, said characteristic lines are interlinked to form a shift performance graph where a boundary line corresponds to a characteristic line of an optimized consumption and another boundary line to a characteristic line of optimized performance. The operating points, between said boundary lines, lie on a so-called dynamic characteristic lines, the position of which depends on the amount of the change of speed of the performance requirement.

The criteria for selecting the shifting performance graph and current dynamic characteristic line, along which the operating point is guided, is thus the rate of alteration of the throttle valve of the engine.

In EP-A 0 657 668, adaptive strategies for optimal adaptation of the shifting performance graphs are divided in a long-time strategy (detection of the type of driver), an intermediate strategy (driving environment) and a short-time strategy (current driving situation).

Depending on the current vehicle type (maximum performance, as well as dependence of the driving resistance on the road speed at medium load), as well as consumption and a sport criteria, two speed-dependent boundary curves of performance are plotted as characteristic lines in the P-v-diagram. A minimum and a maximum rating number is coordinated with said characteristic lines. The current engine performance is determined and compared with the two boundary curves. By the comparison, a current rating number is received which, during travel, is permanently detected. The current rating numbers are subjected to a periodical filtering; hereby a filtered rating number is obtained. With the aid of the filtered rating number, two-dimensional characteristic lines or three-dimensional characteristic line graphs are detected to control the prime mover. The objective of this method is to obtain, for the gear control, only one modified long-time strategy and, when the slip detection is removed from the intermediate-term strategy, to use a short-term strategy.

This known method is advantageous for part of the aspects of a driving strategy, since the current rating number can be found by simple interpolation. The control of the time characteristics by an adequate filter should require no great expenditure. On the other hand, in the known method, it remains open how other no less important aspects of the requirement profile could be taken into account.

To reduce the development periods, it is proposed in the device for control of a continuously variable gear, according to DE-A 44 45 325, to evaluate the engine torque in order to calculate an input torque of a gear. By comparing the calculated input torques of the gear with a nominal driving shaft torque which is based on the parameters that indicate the engine load, a nominal reduction ratio is determined. From the performance graphs of nominal driving shaft torque, a nominal reduction ratio is understood that is compared with the current reduction ratio of the continuously variable gear. From the difference, a correcting variable is derived in order to equate the actual reduction ratio with the nominal reduction ratio. This solution also requires several performance graphs in order to take into account a current mode of driving.

In the device according to DE-A 42 23 967, an output torque of the gear is adjusted within the scope of a preset operating strategy. The presettable operating strategy represents a sport or a consumption-favorable driving characteristic. A performance graph, especially with supporting points, is detected by consumption measurements. The nominal value of the gear transmission ratio is selected as low as possible depending on a minimum speed of the engine and on a desired output torque. The gear transmission ratio remains substantially, at the 50% actuation of the accelerator pedal, at a minimal value and then only rises. With this rough adjustment, an individual application can be omitted under certain circumstances.

International patent applications, WO 90/04119 and WO 94/24463 have disclosed other controls for continuously variable gears which make a limitation of the driving ranges possible in order to improve the driveability.

SUMMARY OF THE INVENTION

This invention is based on the problem of providing a method for setting the transmission ratio of a continuously variable gear in which, taking into account the requirement profile, the application expenditure and the resource requirement are reduced.

The problem on which the invention is based is solved by the fact that the actual operating point setting in a preset driving range, having a lower and an upper boundary, is constantly redefined by processing current, substantially driver-dependent input signals without filtering. Thus, the position of the operating point is constantly recalculated and is predominately determined by the activities of a driver. It is further essential that the constant recalculation develops without delay, that is, without using a filter.

Essential characteristic features of the method, according to the invention, thus are the constant recalculation of the operating point to be set, without using a filter, and the orientation to the upper and lower boundaries of the existing driving range. The operating point is set directly in accordance with the current driving situation and takes into account the range boundaries, that is, without delay due to a filter and by constant recalculation. The characteristic of the method of the invention can be rewritten with a freely, limited setting of the operating point.

In the method, according to the invention, it has proved especially advantageous if the input signals for calculating the setting of the operating point within the boundaries are substantially driver dependent. Thereby the previous usual shifting and/or filter time performance graphs can be eliminated which convert the current driver's desire to a setting of the operating point. The cost of application and need become reduced without impairing the driveability and consumption.

In addition, it proves especially advantageous, in the method of the invention, if the lower and upper boundaries are not fixed but change depending on the vehicle speed and also dynamically adapt themselves to the existing general driving situation generating a dynamic driving range.

Thereby it is possible, within the boundaries of the general driving situation, to convert the current driver's desire in an operating point setting whereby the driveability is substantially improved. The application expenditure is low, since in the simplest case only one parameter—a control factor—has to be adjusted. The resource requirement is small, since all general control parameters can be reproduced on this parameter. The general parameters to which interlinked yield the control factor belong mainly: the current, driver's general mode of driving, the current driving resistance, the driving performance measurement, the current state of the vehicle and a driver's manual contact (with the aid of a selector lever or the like).

Other features essential to the invention and the advantages resulting therefrom are to be understood from the description that follows of several embodiments.

BRIEF DESCRIPTION OF THE DRAWING(S)

In the figures:

FIG. 7 is a diagram for explaining a driving performance characteristic line.

DESCRIPTION OF THE PREFERRED EMBODIMENT(S)

Figure 1:
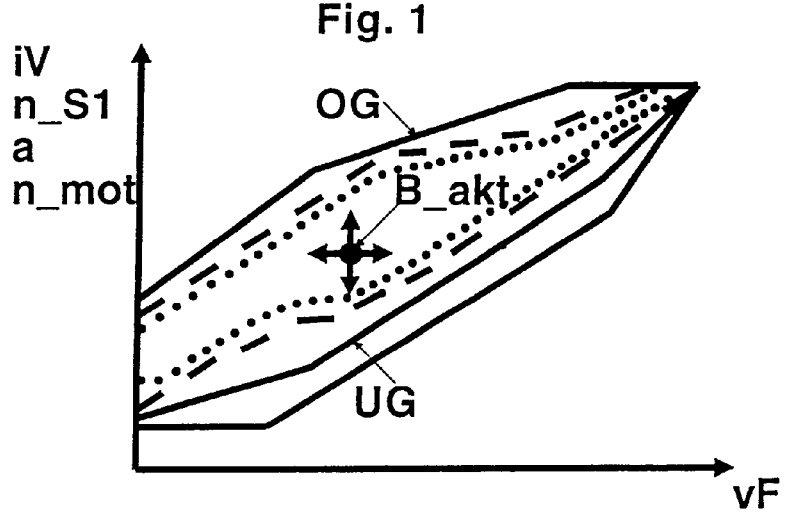
FIG. 1 is a diagrammatic representation of a driving range of a continuously variable gear.
Figure 2:
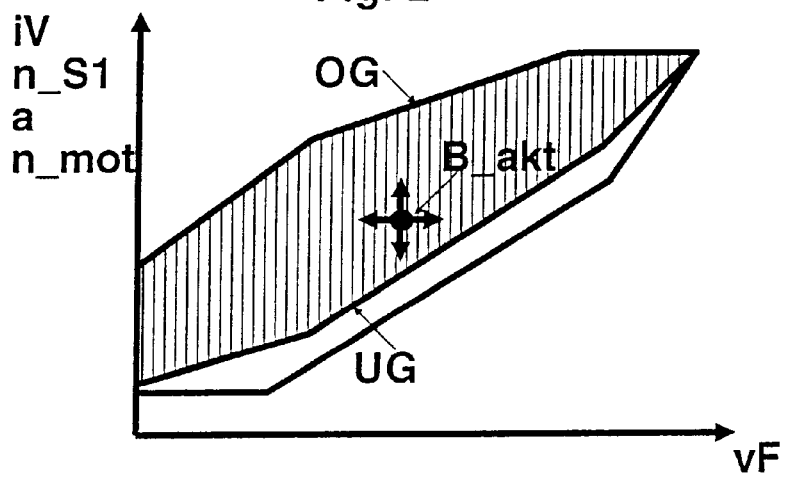
FIG. 2 is the driving range, according to FIG. 1, with a lower boundary.
Figure 3:
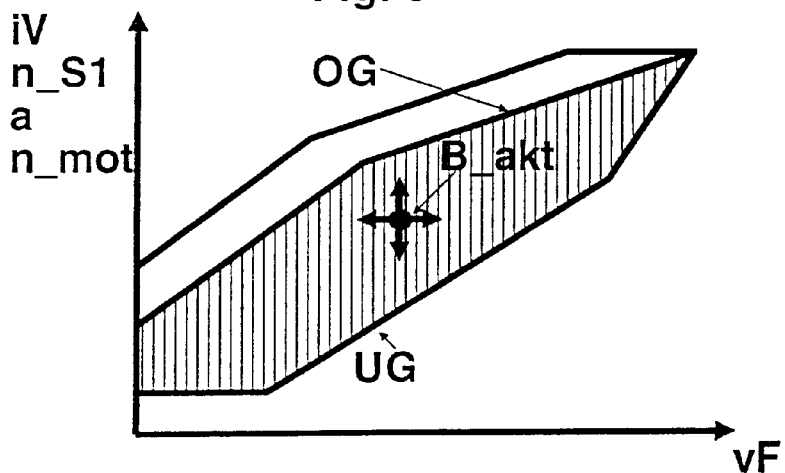
FIG. 3 is the driving range of FIG. 1 with an upper boundary.

The diagrammatic representations, according to FIGS. 1 to 3, serve to discuss fundamental interrelations in the setting of the operating point of a continuously variable gear. The continuously variable gear, just as an engine and a vehicle are not properly reproduced, consists of a cone-pulley gear. It is continuously variably adjusted by a hydraulically operating actuator for changing a reduction ratio iV. The primary or secondary disc of the cone-pulley gear is here driven at a speed n_S1 or n_S2, respectively.

In FIG. 1 a driving range, defined by a lower characteristic line UG and an upper characteristic line OG, is diagrammatically reproduced. The characteristic lines UG and OG are generated by value pairs of the transmission ratio iV or of the speed of the primary disc n_S1 or of the vehicle acceleration a and of the vehicle speed vF. Instead of the mentioned parameters, equivalent parameters can be set. The possible operating points predeterminations are given by the driving range. A current operating point setting B_akt is within the preset driving range. Its position or change in a vertical direction is essentially determined by the operating strategy while the amount of the horizontal displacement results from the vehicle speed vF.

The plotted driving range is changeable. It can be altered by moving the characteristic lines UG and OG which represent the current range boundaries. A confined driving range is then defined by the dotted lines.

In this manner, the characteristic line UG can be displaced upwards until it has assumed its position plotted by the dotted lines. This position could also be understood as a "largest minimum". Similarly to this, the characteristic line OG can be displaced downward to a maximum until reaching the dotted line position. In this case, a "smallest maximum", so to speak, is reached. By the continuously variable displacement of the range boundaries, a driving range corresponding to the general driving situation is set at any time. When the upper range boundary OG, for example, is essentially maintained and the lower range boundary UG is raised, a concentration of the driving range appears in the direction of a setting of the operating point oriented to a higher performance corresponding to a performance-oriented mode of driving. The effects are diagrammatically shown in FIG. 2; if the lower range boundary UG is kept and the upper range boundary OG is displaced downward, the result is a driving range shifted in a direction toward an economic driving mode.

Together with the two variants mentioned above, there is the possibility of displacing the lower range boundary upwardly and the upper range boundary downwardly. The result is a driving range with a characteristic between a performance-oriented and an economic mode of driving ("normal" mode of driving).

In the basic traits, the operating strategy of the invention stands out by two particulars: on one hand, the current operating point setting within the existing driving range appears exclusively, as a result of the actually existing situation, substantially driver dependent (freely limited operating point setting).

On the other hand, the operating point is set to a driving range of variable range boundaries (dynamic driving range). By the parameter-dependent change of the range boundaries, wholesale guidance, so to speak, occurs since the general control setting of the current operating point is oriented to the range boundaries. By the wholesale guidance, it is possible with a small expense application and with not much need of resource to reproduce the basic relationships (for example, "as the vehicle speed increases the engine speed also increases"). At the same time, the general driveability and the consumption tendency are established by the wholesale guidance.

The "freely limited operating point setting" is also characterized by the fact that substantially no filter is used to set transition functions or to detect the operating point by filtering measured or calculated operating parameters. The freely limited operating point setting, based on its structure, is a regulated method with a dynamic output parameter boundary in which the output parameter is preferably normalized or fed back.

Figure 4:
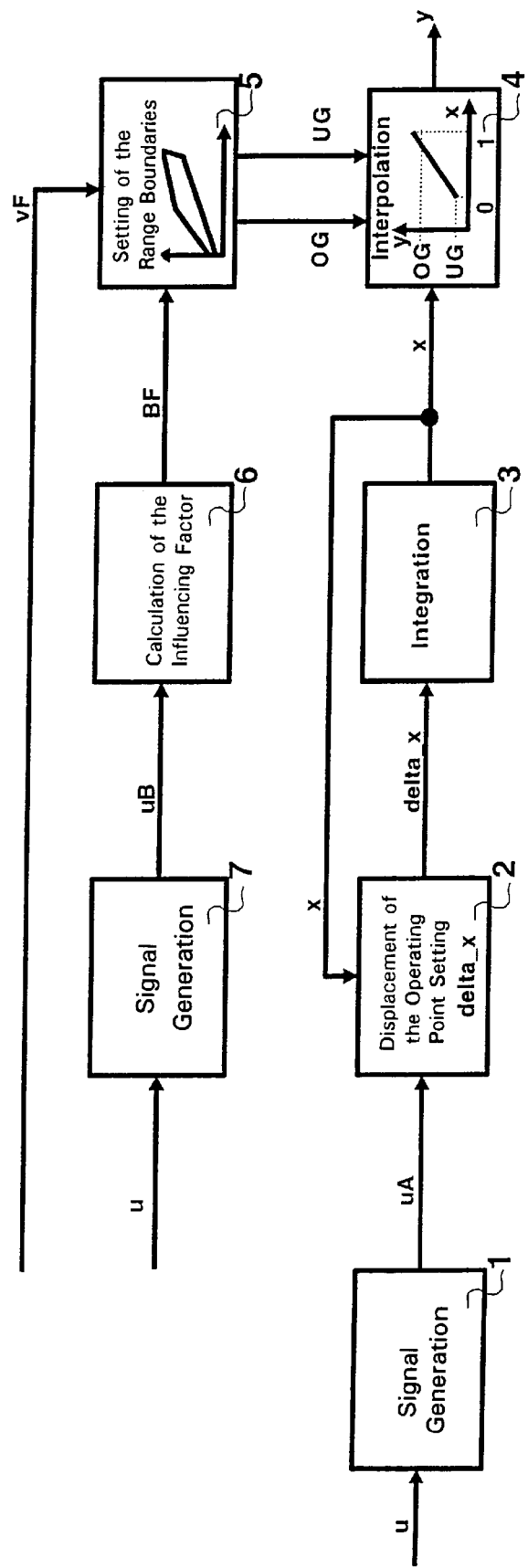
FIG. 4 is a basic structure of a device for setting the operating point.

The above explained operating strategy can be accomplished by at least two basic structures. In FIG. 4 a block gearshift pattern of a first basic structure is reproduced by which the setting of a current operating point B_akt, based upon the existing boundaries of the driving range, is taken up.

In a function block 1 is a multiplicity of input signals for signal generation. Representing the input signals is an input signal u. What is preferably involved here is a speed value (engine speed n_Mot, speed of the primary and/or secondary disc n_S1 or n_S2): of a throttle valve information DKI, of a vehicle acceleration a, of a reduction ratio iV, or any other signals that can be used within the scope of an operating strategy.

The input signal to the function block 1 is converted at least to one logical output signal uA. The logical output signal can correspond to a physical parameter, for example, a driving resistance or a desired performance, an acceleration or a subjective parameter. The logical output signal is sent to a function block 2 as an input signal. In the function block 2, a displacement of the operating point setting Δx can be a Δ-interpolation factor which, for example, sets the percent change of the operating point setting—based on the current upper and lower boundaries OG, UG. In a subsequent integration step 3, said displacement is integrated to a value x which is the operating point setting—based on OG, UG. The value x is fed back to the function block 2. In the calculation step 4 that follows, the value x is calculated by an interpolation in the UG/OG boundaries of the current driving range and between the values x0 and x1, a correcting variable y which is fed as an output signal, for example, to a speed governor, itself not shown, for the engine speed or to a hydraulic actuator for regulating the transmission ratio or the like (and is the real operating point setting). The UG/OG boundaries are used as input signals in the calculation step 4 and are issued by a function block 5 in which the actual drive range is generated.

The correcting variable is calculated according to the formula:

$$y = \frac{OG - UG}{x1 - x0} \cdot (x - x0) + UG$$

With x1=1 and x0=0 y is computed to y=UG+x (OG−UG).

The current parameters UG and OG are determined by a function block 5. This, in particular, has available information about the highest upper and lowest lower boundaries. This can be a characteristic line about the road speed. Together with output signals generated by the function block 6 and other input signals such as road speed vF, the function block detects the current lower and upper boundaries. The input signals of the function block 5, originating from the function block 6, are summarized under the designation BF. BF is composed, in turn, of an influencing factor for the upper boundary OG and an influencing factor for the lower boundary UG.

To the function block 6 is a multiplicity of input signals. Representative of said input signals is an input signal uB which is an information signal of the driving resistance, the current general mode of driving, the current general vehicle state, a driver's manual contact, or other information signal utilizable within the scope of an operating strategy.

The function block 7 generates the output signals (input signal uB) from a multiplicity of input signals u. This is preferably a speed value (engine speed n_Mot, speed of the primary and/or secondary discs n_S1 or n_S2): of a throttle valve information DKI; of a vehicle acceleration a; of a reduction ratio iV; or of any other signals utilizable within the scope of an operating strategy.

A fusion of the function blocks 1 and 7 is possible. The joint function block then generates the signals uA and uB which are fed to the function blocks 2 and 6.

Figure 5:
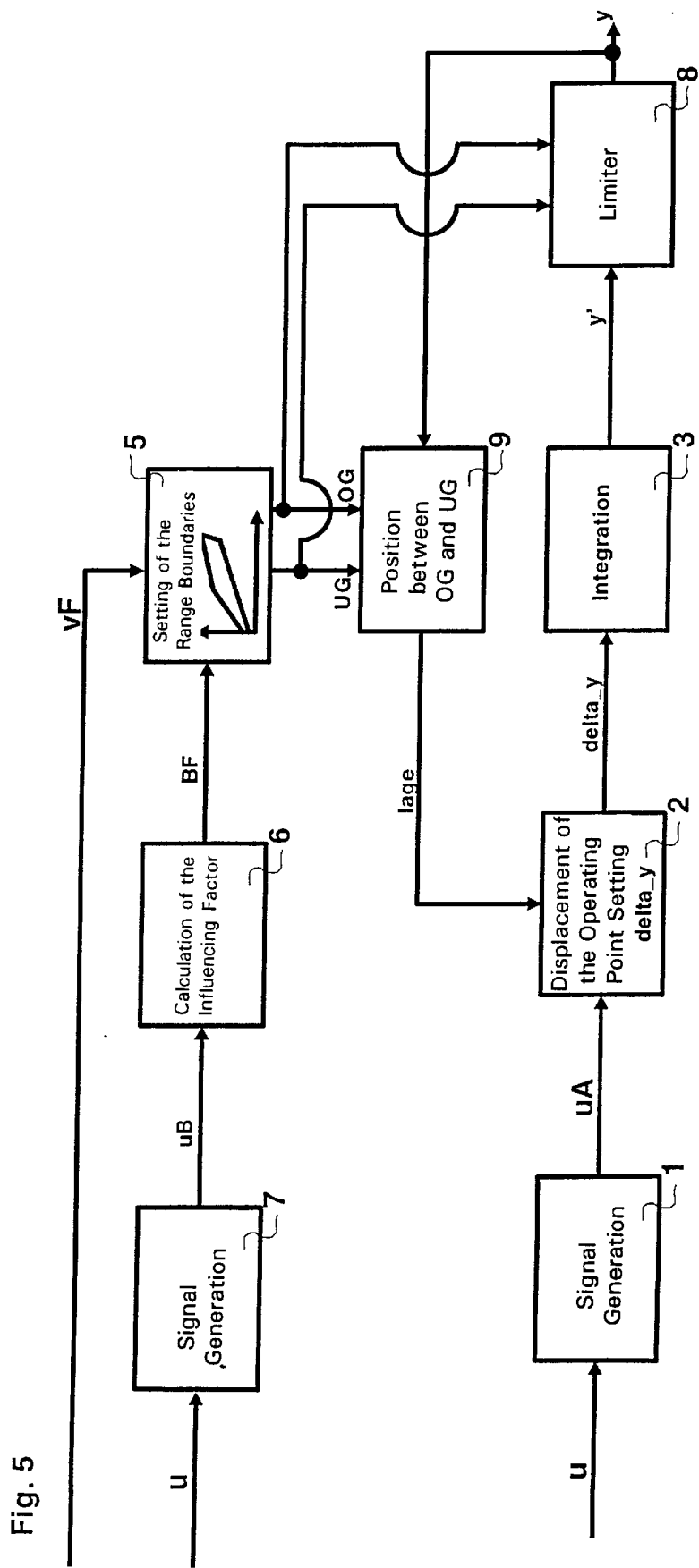
FIG. 5 is another basic structure of a device for setting the operating point.

The second possible basic structure is diagrammatically reproduced in FIG. 5.

The basic structure coincides with that of FIG. 4 with regard to signal generation and the detection of the UG and OG boundaries. The logical output, signal uA, of the function block 1 is fed to function block 2 by which a displacement of the operating point setting Ay, its output signal, is calculated. This can be a change of a nominal reduction ratio $\Delta\_iV\_nom$ or the change of an acceleration $\Delta\_a\_nom$, etc. This displacement is added, in the subsequent integration step 3, to the operation point setting y' (or y in the boundary that follows). In the function block 9, the position of the operating point setting within the UG and OG boundaries of the driving range is determined. The position between said boundaries UF, OG is fed back to the function block 2.

While in the basic structure of FIG. 4, the operating point is indirectly set by an interpolation between the UG and OG boundaries of the driving range, in the basic structure of FIG. 5 the operating point is directly set.

Figure 6:
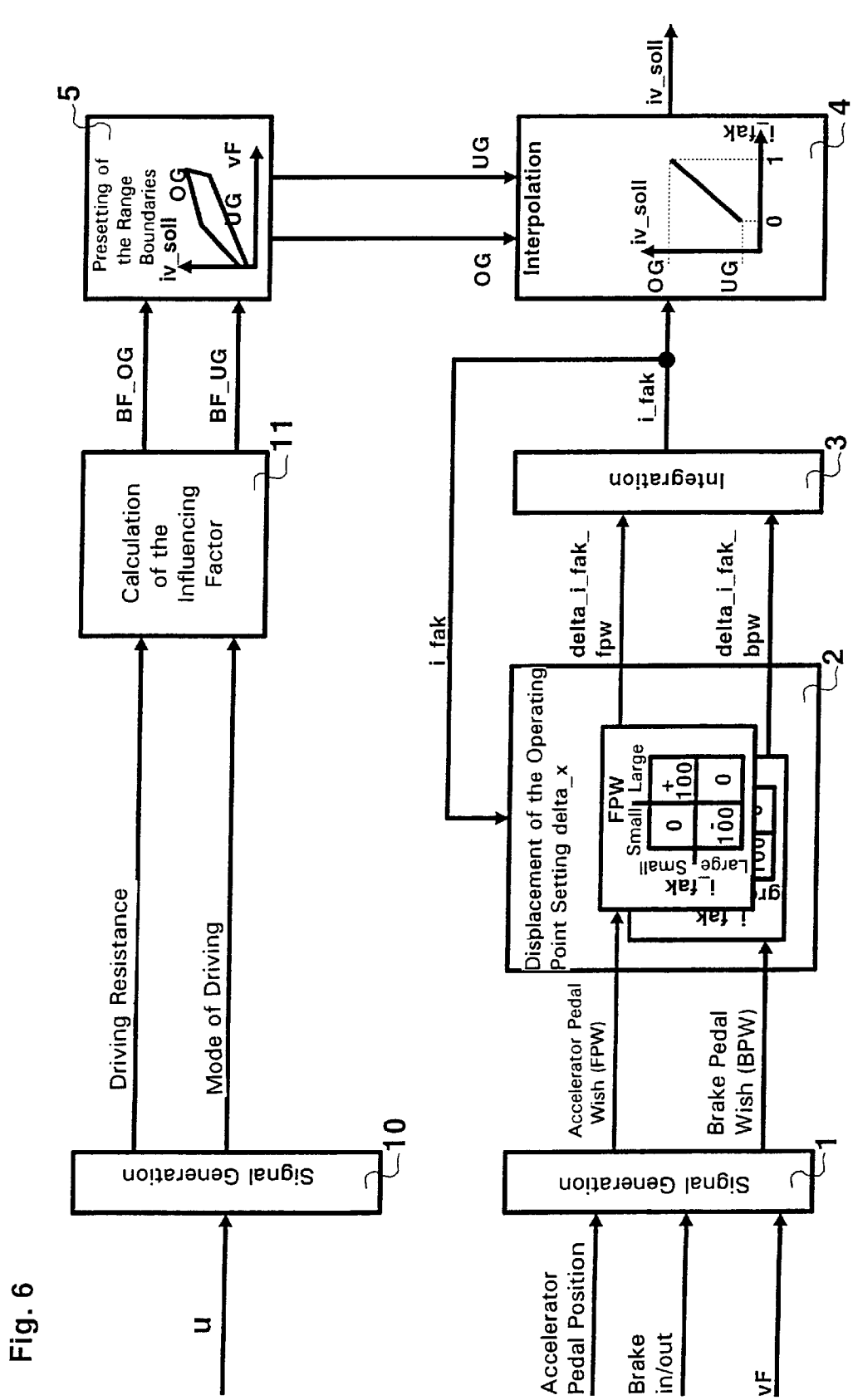
FIG. 6 is a structure of a device for regulating the presetting of the reduction ratio of a continuously variable gear designed with reference to the basic structure of FIG. 4.

In the structure of an operating strategy designed to set the reduction ratio of a continuously variable gear (FIG. 6), several input signals for signal generation are sent to function block 1. These are delivered by different sensors or also according to other control devices. Specifically concerned are especially the accelerator pedal position or the throttle valve position, a braking signal and the speed of the vehicle.

The input signals are processed into logical output signals which correspond to a desired performance, a desired delay and a desired brake. These signals are in function block 2. With the aid of fuzzy control equipments, which are implemented in function block 2, part interpolation factors $\Delta\_i\_$ fak are obtained. The output signals $\Delta i\_fak\_fpw$, $\Delta\_i\_$ fak_bpw preferably mean a standard for a desired change in position of the operating point setting—based on the current upper and lower boundaries OG, UG—as a reaction to the current desired performance, the current desired delay and the current desired brake. This standard can be, for example, a percent indication where 100% corresponds to the distance between the current UG and OG boundaries. It is especially advantageous to multiply the parameters delta_i_fak_fpw and delta_i_fak_bpw by application parameters (not shown). The application is substantially simplified hereby, as in the application only the multiplication factors have not been adjusted but not the fuzzy control equipment itself. Instead of fuzzy control equipment, model-based algorithms can be used.

The values are integrated in the function block 3 to form an interpolation factor i_fak. This is fed back to function block 2 and is also sent to function block 4. The UG, OG boundaries of the actual driving range, which are established in the function block 5, are sent to function block 4. Since the reduction ratio iV has been set here, these are the boundaries iV_min and iV_max.

In determining the current driving range by the function block 5, it is proceeded as follows:

There are input signals u, to a function block 10, which likewise serves for signal generation. The input signals are converted to logical output signals which represent the driving resistance or the mode of driving. In a function block 11, said logical output signals are preferably interlinked to form two control factors BF_OG and BF_UG for the boundaries OG, UG. By means of the influencing factors, a displacement of the range boundaries results, as explained above in relation to FIG. 1.

The process of the invention is not confined to use in connection with a continuously variable gear. It can be similarly used in a stepped automatic gear having, for example, five gears. In this connection, it can prove convenient to provide an additional hysteresis step in order to show the hysteresis ranges between the individual gear steps. By the hysteresis steps the shifting characteristic usual in a stepped automatic machine is obtained. In particular, this hysteresis prevents undesired pendulum switchings.

From the diagram of FIG. 7, the curve of an upper characteristic line can be seen for a maximum driving performance, the driving performance characteristic line FL, not shown. The characteristic line is generated, for example, by pairs of value of the speed of the primary discs n_S1 and of the vehicle speed vF. Instead of said parameters, equivalent parameters can be used such as the transmission ratio iV instead of n_S1.

The establishment of the driving performance characteristic line FL, as an upper characteristic line OG is, in general, dependent on several conditions such as:

a) that the vehicle speed be lower than a specific value—for example, 7 km/h—and that, at the same time, b) the accelerator pedal be actuated in a direction toward a kick-down (KD-Flag=1).

The direction of the driving performance characteristic line FL, as an upper characteristic line OG, likewise is as a rule dependent on several conditions. In the simplest case, it is the condition that the accelerator pedal be actuated back from the kick-down direction (KD-Flag=0).

To influence the dynamic driving range, other modifications are possible. Among the devices which prepare multiple information are included, for example, communication systems for distributing current traffic information, traffic direction and information systems for distributing current traffic information, traffic direction and information systems and systems with which influence on the driving maneuver is received. To these also belong control systems with an adaptive character for control of the automatic transmission of a passenger car. Data for determining a position can be directly used for adapting the control of an automatic transmission to the geographical and specific particulars of the country. In this sense, a system for determining position can be conceived as an additional sensor for input signals. Actual data, for example, for determining the position, can be interlinked with entrained data such as digitalized road maps and data derived from the driver-vehicle system like, for example, transverse acceleration values and wheel speed differences. From the linkage, information about cornering detection, which simplify the steering of a motor vehicle for the driver can be obtained.

Reference Numerals

1 function block
2 function block
3 integration step 4 calculation step
5 function block
6 function block
7 function block
8 function block
9 function block
10 function block
11 function block

What is claimed is:

1. A method of setting the transmission ratio of a continuously variable gear having a means (1, 9) for detecting at least one input signal which is derived from a driver-vehicle system and for processing at least one output signal which can communicate a change, within the scope of an operating strategy, of at least one of a setting of a reduction ratio, a setting of a speed of a prime mover and a setting of a vehicle acceleration, said method comprising the step of:

constantly redetermining an operating point setting (B_akt) for said gear in a preset driving range having a lower boundary (UG) and an upper boundary (OG) by said means processing actual, substantially driver-dependent input signals without filtering;

converting the at least one input signal (u) to a logical output signal (uB), and said input signal is at least one of a driving resistance and a driver's mode of driving and said logical output signal is linked to an influencing factor which varies the range boundaries (UG, OG);

generating a dynamic driving range, essentially based upon said signal input of a current driving situation, by said means varying said lower, and upper boundaries (UG, OG) of the preset driving range.

2. The method according to claim 1, further comprising the step of orientating the operating point setting (B_akt) in the dynamic driving range.

3. The method according to claim 1, further comprising the step of changing the influencing factor (BF) by manual contact of a driver.

4. The method according to claim 3, further comprising the step of changing the influencing factor (BF) by a temperature of the vehicle.

5. A method of setting the transmission ratio of a continuously variable gear having means (1, 9) for detecting at least one input signal which is derived from a driver-vehicle system and for processing at least one output signal which can communicate a change, within the scope of an operating strategy, of at least one of a setting of a reduction ratio, a setting of a speed of a prime mover and a setting of a vehicle acceleration, said method comprising the steps of:

constantly redetermining an operating point setting (B_akt) for said hear in a preset driving range having a lower boundary (UG) and an upper boundary (OG) by said means processing actual, substantially driver-dependent input signals without filtering; and converting the at least one input signal (u) to at least one logical output signal (uA), calculating from said logical output signal a displacement (delta_x) of the operating point setting subsequently integrating said displacement into a parameter (x) and calculating by interpolation, taking into account the range boundaries (UG, OG), an adjustment parameter (y) used to communicate said change.

6. The method according to claim 5, further comprising the step of, by said means, processing several logical output signals (uA) into part interpolation factors (Δ_i_fak), combining said part interpolation factors to form an interpolation factor (i_fak) and interpolating, taking into account the range boundaries (UG, OG), an output signal (iV_nom).

7. The method according to claim 6, further comprising the step of, by said means, comparing the output signal (iV_nom) with boundary gradients for an upshift and a downshift (HS, RS).

8. The method according to claim 6, further comprising the step of converting the logical output signals (uA) to part interpolation factors (Δ_i_fak) by control equipment.

9. The method according to claim 5, further comprising the step of, by the adjustment parameter, setting at least one of the transmission ratio, an engine speed (n_Mot), and a speed of the primary disc (n_S1) of the continuously variable gear.

10. The method according to claim 5, further comprising the step of feeding the parameter (x) back for calculating the displacement.

11. A method of setting the transmission ratio of a continuously variable gear having means (1, 9) for detecting at least one input signal which is derived from a driver-vehicle system and for processing at least one output signal which can communicate a change, within the scope of an operating strategy, of at least one of a setting of a reduction ratio, a setting of a speed of a prime mover and a setting of a vehicle acceleration, said method comprising the steps of:

constantly redetermining an operating point setting (B_akt) for said gear in a preset driving range having a lower boundary (UG) and an upper boundary (OG) by said means processing actual, substantially driver-dependent input signals without filtering; and converting the at least one input signal (u) to at least one logical output signal (uA), calculating from said logical output signal a displacement (delta_y) of the operating point integrating said displacement into an operation point setting (y'), and interpolating from said operation point setting, taking into account the range boundaries (UG, OG), a correcting variable (y).

12. The method according to claim 11, further comprising the step of setting the acceleration (a) by the output signal.

13. The method according to claim 11, further comprising the step of converting the logical output signals (uA) by fuzzy-logic control equipment to displacement of the operating point setting (delta_y).

14. The method according to claim 11, further comprising the step of feeding the position of the correcting variable (y) between the range boundaries (UG, OG) back for calculating the displacement.

15. A method of setting the transmission ratio of a continuously variable gear having means (1, 9) for detecting at least one input signal which is derived from a driver-vehicle system and for processing at least one output signal which can communicate a change, within the scope of an operating strategy, of at least one of a setting of a reduction ratio, a setting of a speed of a prime mover and a setting of a vehicle acceleration, said method comprising the steps of:

constantly redetermining an operating point setting (B_akt) for said continuously variable gear in a preset driving range having a lower boundary (UG) and an upper boundary (OG) by said means processing actual, substantially driver-dependent input signals without filtering;

generating a dynamic driving range, essentially based upon said signal input of a current driving situation, by said means varying said lower and upper boundaries (UG, OG) of the preset driving range;

orientating the operating point setting (B_akt) in the dynamic driving range; and converting, by said means, the at least one input signal (u) to at least one logical output signal (uA), calculating from said logical output signal a displacement (delta_x) of the operating point setting, subsequently integrating said displacement into a parameter (x) and calculating by interpolation, taking into account the range boundaries (UG, OG), an adjustment parameter (y) used to communicate said change.

\* \* \* \* \*